United States Patent
List

(10) Patent No.: US 10,123,119 B1
(45) Date of Patent: *Nov. 6, 2018

(54) VOICE CONTROLLED ASSISTANT WITH STEREO SOUND FROM TWO SPEAKERS

(71) Applicant: Amazon Technologies, Inc., Seattle, WA (US)

(72) Inventor: Timothy T. List, Santa Cruz, CA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/645,612

(22) Filed: Jul. 10, 2017

Related U.S. Application Data

(60) Continuation of application No. 14/627,152, filed on Feb. 20, 2015, now Pat. No. 9,706,306, which is a division of application No. 13/532,156, filed on Jun. 25, 2012, now Pat. No. 8,971,543.

(51) Int. Cl.
*H04R 5/00* (2006.01)
*G10L 17/22* (2013.01)

(52) U.S. Cl.
CPC ............... *H04R 5/00* (2013.01); *G10L 17/22* (2013.01)

(58) Field of Classification Search
CPC ...................................... H04R 5/00
USPC ........................................ 381/300
See application file for complete search history.

(56) References Cited

U.S. PATENT DOCUMENTS

| | | | |
|---|---|---|---|
| 5,708,719 A | 1/1998 | Greenberger et al. | |
| 7,043,031 B2 | 5/2006 | Klayman et al. | |
| 7,418,392 B1 | 8/2008 | Mozer et al. | |
| 7,720,683 B1 | 5/2010 | Vermeulen et al. | |
| 7,774,204 B2 | 8/2010 | Mozer et al. | |
| 7,983,429 B2 | 7/2011 | Keys | |
| 8,483,396 B2 | 7/2013 | Amadu et al. | |
| 8,699,528 B2 | 4/2014 | Erell et al. | |
| 8,971,543 B1 | 3/2015 | List | |

(Continued)

FOREIGN PATENT DOCUMENTS

WO    WO2011088053 A2    7/2011

OTHER PUBLICATIONS

Office action for U.S. Appl. No. 14/627,152, dated Sep. 19, 2016, Yao et al., Voice Controlled Assistant with Stereo Sound from Two Speakers, 6 pages.

(Continued)

*Primary Examiner* — Susan McFadden
(74) *Attorney, Agent, or Firm* — Lee & Hayes, PLLC

(57) ABSTRACT

A voice controlled assistant has two speakers and stereo component configured to produce high quality stereo sound. The stereo component generates a first channel signal and a second channel signal used to produce stereo sound. The first channel signal is filtered to remove a range of frequencies, such as the low frequency range. The filtered first channel signal is passed to a first transducer associated with a first speaker to output a first part of the stereo sound. The second channel signal, together with the frequency portion removed from the first channel signal, are provided to a second transducer associated with a second speaker to output a second part of the stereo sound. In this manner, the two speaker arrangement plays stereo, without distortion, while preserving all frequencies in the signals.

20 Claims, 7 Drawing Sheets

(56) References Cited

U.S. PATENT DOCUMENTS

| | | | |
|---|---|---|---|
| 9,060,224 B1 * | 6/2015 | List | G10L 15/08 |
| 9,390,724 B2 * | 7/2016 | List | G10L 15/08 |
| 9,706,306 B1 * | 7/2017 | List | H04R 5/00 |
| 9,837,083 B1 * | 12/2017 | List | G10L 17/22 |
| 2012/0223885 A1 | 9/2012 | Perez | |

OTHER PUBLICATIONS

Pinhanez, "The Everywhere Displays Projector: A Device to Create Ubiquitous Graphical Interfaces", IBM Thomas Watson Research Center, Ubicomp 2001, Sep. 30-Oct. 2, 2001, 18 pages.

* cited by examiner

VOICE CONTROLLED ASSISTANT WITH STEREO SOUND FROM TWO SPEAKERS

CROSS-REFERENCE TO RELATED APPLICATIONS

This application is continuation of U.S. patent application Ser. No. 14/627,152 entitled "Voice Controlled Assistant with Stereo Sound from Two Speakers," filed on Feb. 20, 2015, issuing as U.S. Pat. No. 9,706,306 on Jul. 11, 2017 which is a divisional of, and claims priority to commonly-owned U.S. patent application Ser. No. 13/532,156, entitled "Voice Controlled Assistant with Stereo Sound from Two Speakers", filed on Jun. 25, 2012, issued as U.S. Pat. No. 8,971,543 on Mar. 3, 2015, which applications are incorporated by reference herein in their entirety.

BACKGROUND

Homes are becoming more wired and connected with the proliferation of computing devices such as desktops, tablets, entertainment systems, and portable communication devices. As these computing devices evolve, many different ways have been introduced to allow users to interact with computing devices, such as through mechanical devices (e.g., keyboards, mice, etc.), touch screens, motion, gesture, and speech.

When using speech as an input, the device is commonly equipped with microphones to receive voice input and a speech recognition component that attempts to recognize the voice input. This voice input often competes with other audible sounds that might be received by the microphones, such as background voices, ambient noise, acoustic echoes, and double talk. Double talk refers to a situation where sound from the near end talker reaches the microphones simultaneously with sound from the far end talker that is played out through the device loudspeakers. That is, sound played out of the loudspeaker (e.g., sound corresponding to signals received from the far end talker) echoes and reaches the microphones, along with sound from the near end talker.

These devices are often used for multiple purposes. In addition to outputting vocal conversation from a far end talker, for example, the device loudspeakers may be used to output music, movie soundtracks, and the like. Often these devices have small form factors. One of the challenges with devices of a small form factor is the ability to generate and to output high quality sound. This challenge is exacerbated by the additional requirements that the device still clearly receive voice input from a near end talker even during high fidelity sound output.

Accordingly, there is an ongoing need for improved architectures of voice enabled devices that have small form factors, output high quality audio, and yet remain responsive to voice input from the user.

BRIEF DESCRIPTION OF THE DRAWINGS

The detailed description is described with reference to the accompanying figures. In the figures, the left-most digit(s) of a reference number identifies the figure in which the reference number first appears. The same reference numbers in different figures indicate similar or identical items.

DETAILED DESCRIPTION

Figure 1:
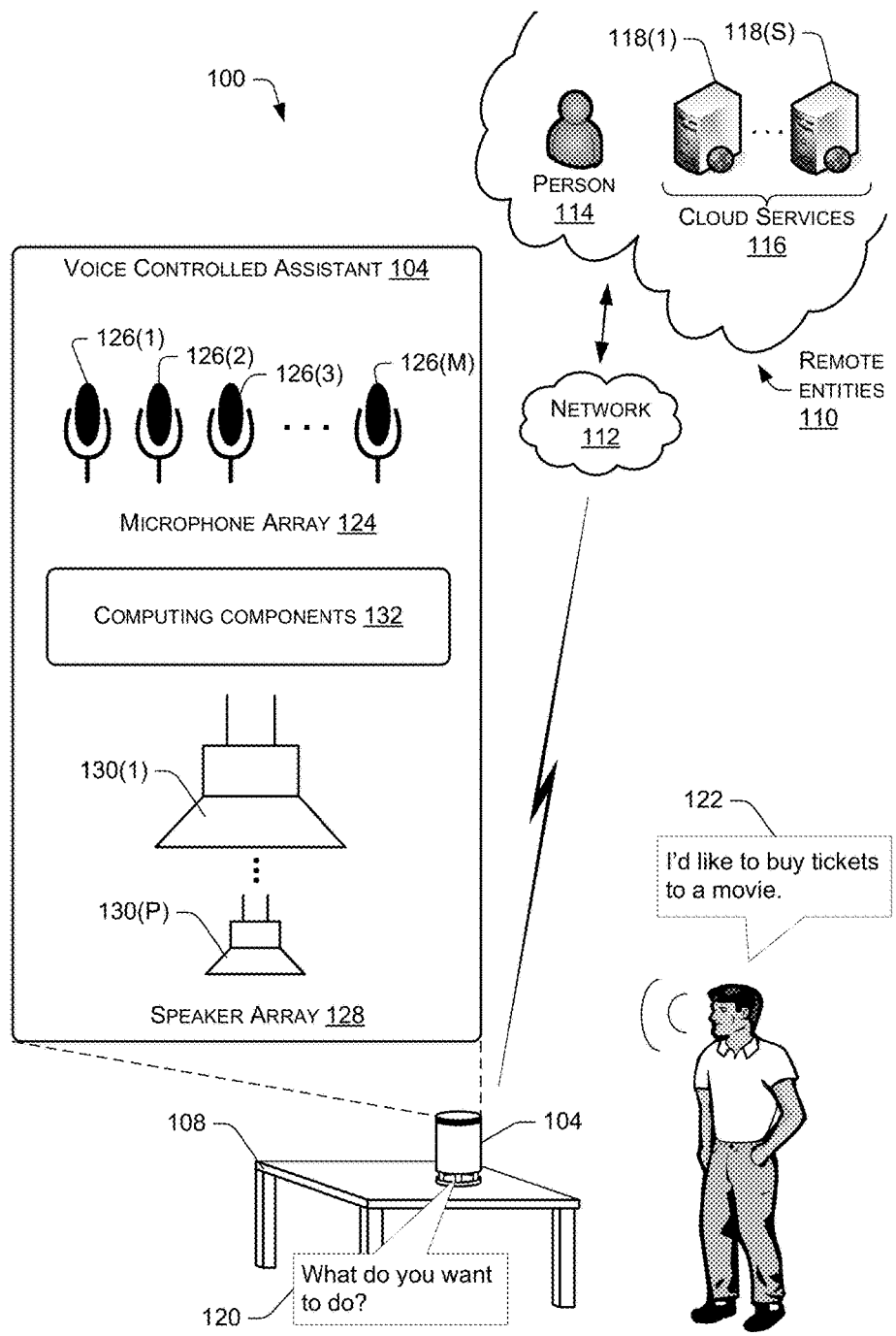
FIG. 1 shows an illustrative voice interactive computing architecture set in an example environment that includes a near end talker communicating with a far end talker or cloud service through use of a voice controlled assistant. The voice controlled assistant is shown according to a first implementation.

A voice controlled assistant that produces high quality stereo sound from two speakers is described. The voice controlled assistant is described in the context of an architecture in which the assistant is connected to far end talkers or a network accessible computing platform, or "cloud service", via a network. The voice controlled assistant may be implemented as a hands-free device equipped with a wireless LAN (WLAN) interface. The voice controlled assistant relies primarily, if not exclusively, on voice interactions with a user.

The voice controlled assistant may be positioned in a room (e.g., at home, work, store, etc.) to receive user input in the form of voice interactions, such as spoken requests or a conversational dialogue. Depending on the request, the voice controlled assistant may perform any number of actions. For instance, the assistant may play music or emit verbal answers to the user. The assistant may alternatively function as a communication device to facilitate network voice communications with a far end talker. As still another alternative, the user may ask a question or submit a search request to be performed by a remote cloud service. For instance, the user's voice input may be transmitted from the assistant over a network to the cloud service, where the voice input is interpreted and used to perform a function. In the event that the function creates a response, the cloud service transmits the response back over the network to the assistant, where it may be audibly emitted.

The voice controlled assistant is designed to output high quality full spectrum sound, in stereo, using a limited number of speakers (e.g., 2 speakers). One challenge for creating stereo and full spectrum sound with only two transducers is the inherent design of transducers, in that no transducer reproduces the full sound spectrum linearly. Therefore, high quality systems use multiple sizes of transducers per channel, where each transducer is tuned for specific frequency ranges. Unfortunately, for devices such as the voice controlled assistant, implementing multiple transducers adds cost and complexity.

As a result, the voice controlled assistant is designed to achieve several competing objectives: comparatively low cost, high fidelity full spectrum audio, stereo audio, and a small form factor. The voice controlled assistant described herein meets these objectives, without significantly interfering with an acoustic echo cancellation (AEC) module that attempts to remove extraneous sound components in an audio signal to isolate a user's speech.

To satisfy these disparate objectives, the voice controlled assistant is equipped with two dissimilar transducers. In the described implementation, there is a smaller transducer for a small speaker and a large transducer for a large speaker. A right channel signal for the stereo is routed to one of the transducers and a left channel signal is routed to the other of the transducers. Typically, each of the transducers would be unable to reproduce a certain section of the sound spectrum, such as the low frequencies since such frequencies are typically hardest to replicate and may cause distortion on smaller transducers. To overcome this challenge, the channel signal that is sent to the smaller transducer/speaker is filtered to remove low frequencies that might cause distortion in the small speaker. The filtered portion (e.g., low frequencies) is combined with the channel signal going to the larger transducer/speaker so that this portion of the audio is preserved. Because low frequency sound is less directional, adding this frequency portion of the signal to the other channel will be mostly undetectable by human ears, and yet the device maintains full frequency response without distorting the smaller transducer. Also, the transducers are properly configured so that any potential adverse affect of having different speakers create the same high frequencies will be negligible, resulting in high quality stereo output.

Some of the techniques described herein may be implemented in other electronic devices besides a voice controlled assistant. For instance, aspects may be implemented in communications devices, tablet or computing devices, or any number of electronic devices that is capable of producing sound from one or more speakers and receiving sound in one or more microphones.

The architecture may be implemented in many ways. Various example implementations are provided below. However, the architecture may be implemented in many other contexts and situations different from those shown and described below.

Illustrative Environment and Device

FIG. 1 shows an illustrative architecture 100, set in an exemplary environment 102, which includes a voice controlled assistant 104 and a user 106 of the voice controlled assistant 104. Although only one user 106 is illustrated in FIG. 1, multiple users may use the voice controlled assistant 104. The user 106 may be located proximal to the voice controlled assistant 104, and hence serve as a near end talker in some contexts.

In this illustration, the voice controlled assistant 104 is physically positioned on a table 108 within the environment 102. The voice controlled assistant 104 is shown sitting upright and supported on its base end. In other implementations, the assistant 104 may be placed in any number of locations (e.g., ceiling, wall, in a lamp, beneath a table, on a work desk, in a hall, under a chair, etc.). The voice controlled assistant 104 is shown communicatively coupled to remote entities 110 over a network 112. The remote entities 110 may include individual people, such as person 114, or automated systems (not shown) that serve as far end talkers to verbally interact with the user 106. The remote entities 110 may alternatively comprise cloud services 116 hosted, for example, on one or more servers 118(1), . . . , 118(S). These servers 118(1)-(S) may be arranged in any number of ways, such as server farms, stacks, and the like that are commonly used in data centers.

The cloud services 116 generally refer to a network accessible platform implemented as a computing infrastructure of processors, storage, software, data access, and so forth that is maintained and accessible via a network such as the Internet. Cloud services 116 do not require end-user knowledge of the physical location and configuration of the system that delivers the services. Common expressions associated with cloud services include "on-demand computing", "software as a service (SaaS)", "platform computing", "network accessible platform", and so forth.

The cloud services 116 may host any number of applications that can process the user input received from the voice controlled assistant 104, and produce a suitable response. Example applications might include web browsing, online shopping, banking, email, work tools, productivity, entertainment, educational, and so forth.

In FIG. 1, the user 106 is shown communicating with the remote entities 110 via the voice controlled assistant 104. The assistant 104 outputs an audible questions, "What do you want to do?" as represented by dialog bubble 120. This output may represent a question from a far end talker 114, or from a cloud service 116 (e.g., an entertainment service). The user 106 is shown replying to the question by stating, "I'd like to buy tickets to a movie" as represented by the dialog bubble 122.

The voice controlled assistant 104 is equipped with an array 124 of microphones 126(1), . . . , 126(M) to receive the voice input from the user 106 as well as any other audio sounds in the environment 102. The microphones 126(1)-(M) are generally arranged at a first or top end of the assistant 104 opposite the base end seated on the table 108, as will be described in more detail with reference to FIGS. 5 and 6. Although multiple microphones are illustrated, in some implementations, the assistant 104 may be embodied with only one microphone.

The voice controlled assistant 104 may further include a speaker array 128 of speakers 130(1), . . . , 130(P) to output sounds in humanly perceptible frequency ranges. The speakers 130(1)-(P) may be configured to emit sounds at various frequency ranges, so that each speaker has a different range. In this manner, the assistant 104 may output high frequency signals, mid frequency signals, and low frequency signals. The speakers 130(1)-(P) are generally arranged at a second or base end of the assistant 104 and oriented to emit the sound in a downward direction toward the base end and opposite to the microphone array 124 in the top end. One particular arrangement is described below in more detail with reference to FIG. 5. Although any number of speakers are represented in this illustration, aspects of this disclosure particularly pertain to an assistant 104 embodied with two speakers having associated transducers of differing sizes.

The voice controlled assistant 104 may further include computing components 132 that process the voice input received by the microphone array 124, enable communication with the remote entities 110 over the network 112, and generate the audio to be output by the speaker array 128. The computing components 132 are generally positioned between the microphone array 123 and the speaker array 128, although essentially any other arrangement may be used. One collection of computing components 132 is illustrated and described with reference to FIG. 3.

In the FIG. 1 architecture, the voice controlled assistant 104 may be configured to produce stereo or non-stereo output. The speakers 130(1)-(P) may receive a mono signal for output in a non-stereo configuration. Alternatively, the computing components 132 may generate and output to the speakers 130(1)-(P) two different channel signals for stereo output. In this stereo configuration, a first channel signal (e.g., left channel signal) is provided to one of the speakers, such as the larger speaker 130(1). A second channel signal (e.g., right channel signal) is provided to the other of the speakers, such as the smaller speaker 130(P). Due to the vertically stacked arrangement of the speakers, however, the two-channel stereo output may not be appreciated to the user 106.

Figure 2:
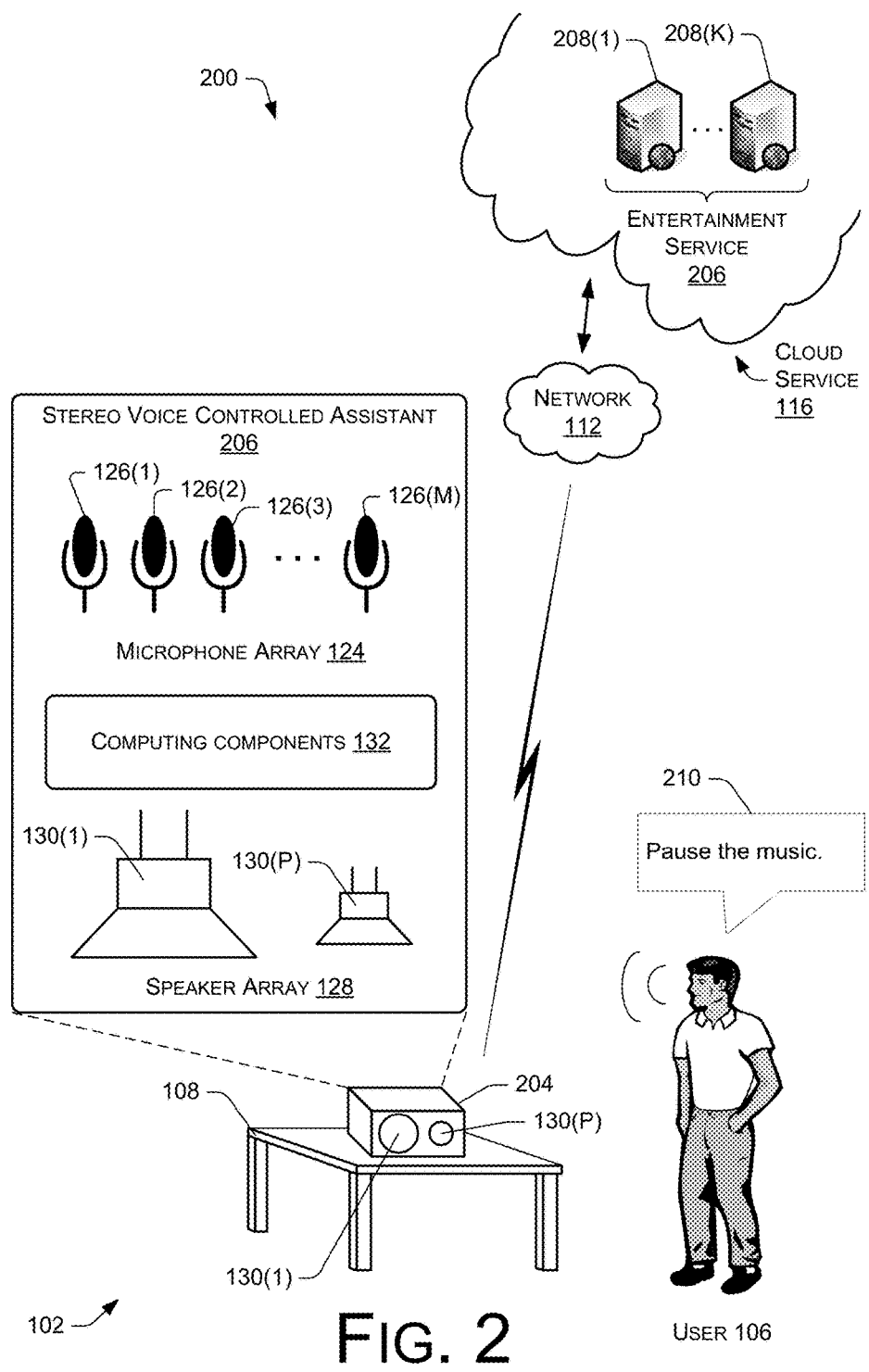
FIG. 2 shows an illustrative voice interactive computing architecture similar to FIG. 1, but with a voice controlled assistant having a different speaker arrangement to better support stereo output.

FIG. 2 shows another implementation of voice interactive computing architecture 200 similar to the architecture 100 of FIG. 1. But in this illustration, a voice controlled assistant 204 has a different physical packaging layout that allows a spaced arrangement of the speakers to better provide stereo output, rather the vertically stacked arrangement found in the assistant 104 of FIG. 1. More particularly, the speakers 130(1)-(P) are shown at a horizontally spaced distance from one another. In one implementation described herein, the voice controlled assistant 204 is able to play full spectrum stereo using only two speakers of different sizes.

In FIG. 2, the voice controlled assistant 204 is communicatively coupled over the network 112 to an entertainment service 206 that is part of the cloud services 116. The entertainment service 206 is hosted on one or more servers, such as servers 208(1), . . . , 208(K), which may be arranged in any number of configurations, such as server farms, stacks, and the like that are commonly used in data centers.

The entertainment service 206 may be configured to stream or otherwise download entertainment content, such as movies, music, audio books, and the like to the voice controlled assistant. When audio content is involved, the voice controlled assistant 204 can play the audio in stereo with full spectrum sound quality, even though the device has a small form factor and only two speakers.

In this example scenario, the user 106 is shown directing the assistant 204 to pause the music being played through the audible statement, "Pause the music" in dialog bubble 210. To support this scenario, the voice controlled assistant 204 is not only designed to play music in full spectrum stereo, but is also configured with an acoustic echo cancellation (AEC) module to cancel audio components being received at the microphone array 124 so that the assistant 204 can clearly hear the statements and commands spoken by the user 106.

Illustrative Voice Controlled Assistant

Figure 3:
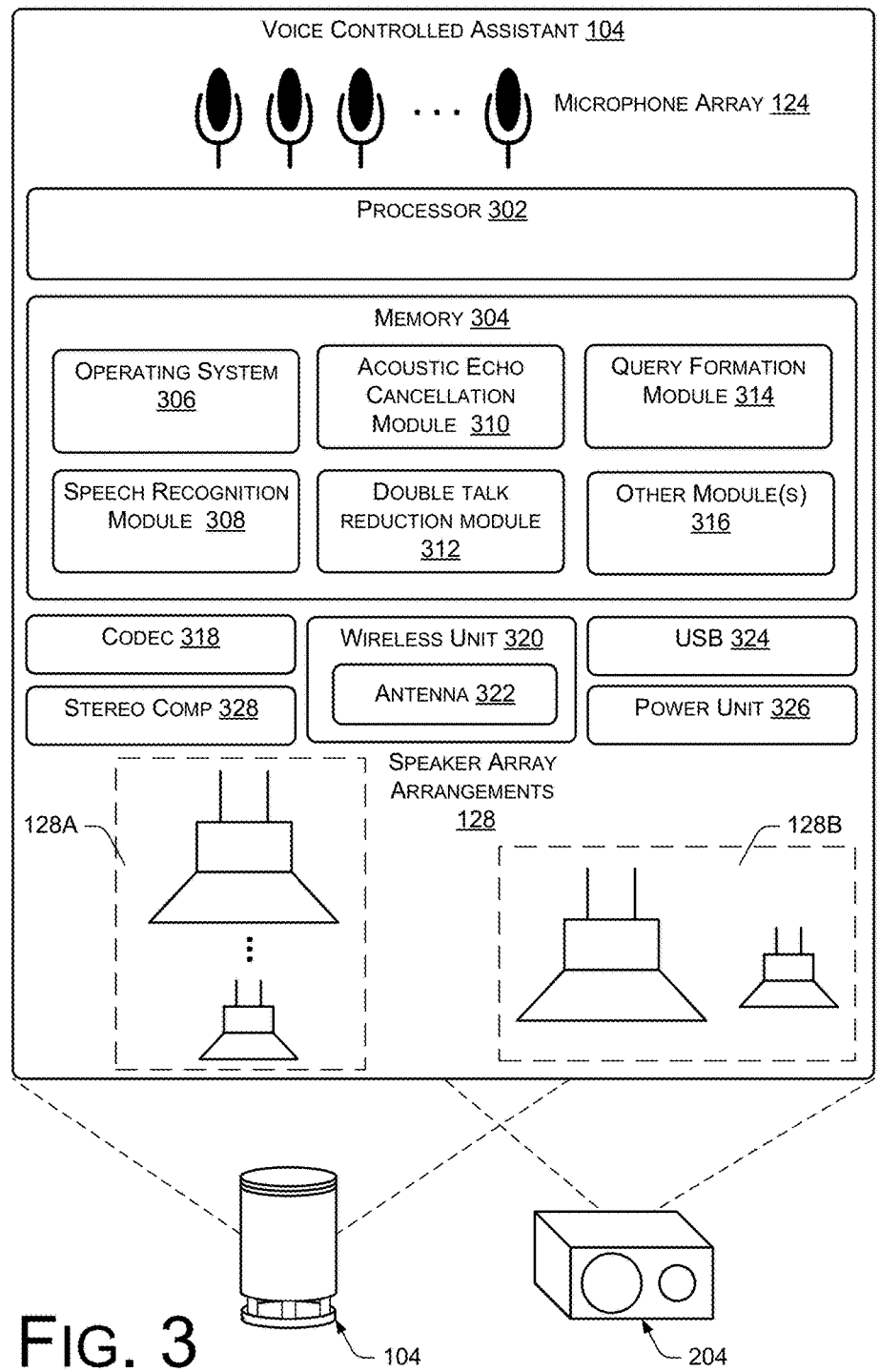
FIG. 3 shows a block diagram of selected functional components implemented in the voice controlled assistants of FIGS. 1 and 2.

FIG. 3 shows selected functional components of the voice controlled assistants 104 and 204 in more detail. Generally, each of the voice controlled assistants 104 and 204 may be implemented as a standalone device that is relatively simple in terms of functional capabilities with limited input/output components, memory, and processing capabilities. For instance, the voice controlled assistants 104 and 204 may not have a keyboard, keypad, or other form of mechanical input. Nor do they have a display or touch screen to facilitate visual presentation and user touch input. Instead, the assistants 104 and 204 may be implemented with the ability to receive and output audio, a network interface (wireless or wire-based), power, and limited processing/memory capabilities.

In the illustrated implementation, each voice controlled assistant 104/204 includes the microphone array 124, a speaker array 128, a processor 302, and memory 304. The microphone array 124 may be used to capture speech input from the user 106, or other sounds in the environment 102. The speaker array 128 may be used to output speech from a far end talker, audible responses provided by the cloud services, forms of entertainment (e.g., music, audible books, etc.), or any other form of sound. The speaker array 128 may output a wide range of audio frequencies including both human perceptible frequencies and non-human perceptible frequencies. In one implementation, the speaker array 128 is formed of two speakers capable of outputting full spectrum stereo sound, as will be described below in more detail. Two speaker array arrangements are shown, including the vertically stacked arrangement 128A and the horizontally spaced arrangement 128B.

The memory 304 may include computer-readable storage media ("CRSM"), which may be any available physical media accessible by the processor 302 to execute instructions stored on the memory. In one basic implementation, CRSM may include random access memory ("RAM") and Flash memory. In other implementations, CRSM may include, but is not limited to, read-only memory ("ROM"), electrically erasable programmable read-only memory ("EEPROM"), or any other medium which can be used to store the desired information and which can be accessed by the processor 302.

Several modules such as instruction, datastores, and so forth may be stored within the memory 304 and configured to execute on the processor 302. An operating system module 306 is configured to manage hardware and services (e.g., wireless unit, USB, Codec) within and coupled to the assistant 104/204 for the benefit of other modules. Several other modules may be provided to process verbal input from the user 106. For instance, a speech recognition module 308 provides some level of speech recognition functionality. In some implementations, this functionality may be limited to specific commands that perform fundamental tasks like waking up the device, configuring the device, and the like. The amount of speech recognition capabilities implemented on the assistant 104/204 is an implementation detail, but the architecture described herein can support having some speech recognition at the local assistant 104/204 together with more expansive speech recognition at the cloud service 116.

An acoustic echo cancellation module 310 and a double talk reduction module 312 are provided to process the audio signals to substantially cancel acoustic echoes and substantially reduce double talk that may occur. These modules may work together to identify times where echoes are present, where double talk is likely, where background noise is present, and attempt to reduce these external factors to isolate and focus on the near talker. By isolating on the near talker, better signal quality is provided to the speech recognition module 308 to enable more accurate interpretation of the speech utterances.

A query formation module 314 may also be provided to receive the parsed speech content output by the speech recognition module 308 and to form a search query or some form of request. This query formation module 314 may utilize natural language processing (NLP) tools as well as various language modules to enable accurate construction of queries based on the user's speech input.

The modules shown stored in the memory 304 are merely representative. Other modules 316 for processing the user voice input, interpreting that input, and/or performing functions based on that input may be provided.

The voice controlled assistant 104/204 might further include a codec 318 coupled to the microphones of the microphone array 124 and the speakers of the speaker array 128 to encode and/or decode the audio signals. The codec 318 may convert audio data between analog and digital formats. A user may interact with the assistant 104/204 by speaking to it, and the microphone array 124 receives the user speech. The codec 318 encodes the user speech and transfers that audio data to other components. The assistant 104/204 can communicate back to the user by emitting audible statements passed through the codec 318 and output through the speaker array 128. In this manner, the user interacts with the voice controlled assistant simply through speech, without use of a keyboard or display common to other types of devices.

The voice controlled assistant 104/204 includes a wireless unit 320 coupled to an antenna 322 to facilitate a wireless connection to a network. The wireless unit 320 may implement one or more of various wireless technologies, such as wifi, Bluetooth, RF, and so on.

A USB port 324 may further be provided as part of the assistant 104/204 to facilitate a wired connection to a network, or a plug-in network device that communicates with other wireless networks. In addition to the USB port 324, or as an alternative thereto, other forms of wired connections may be employed, such as a broadband connection. A power unit 326 is further provided to distribute power to the various components on the assistant 104/204.

A stereo component 328 is also provided to output stereo signals to the various speakers in the speaker array 128. As one example, a left channel is provided to one speaker, such as a larger speaker, and a right channel is provided to another speaker, such as a smaller speaker. The stereo component 328 is described in more detail with reference to FIG. 4.

The voice controlled assistant 104/204 is designed to support audio interactions with the user, in the form of receiving voice commands (e.g., words, phrase, sentences, etc.) from the user and outputting audible feedback to the user. Accordingly, in the illustrated implementation, there are no haptic input devices, such as navigation buttons, keypads, joysticks, keyboards, touch screens, and the like. Further there is no display for text or graphical output. In one implementation, the voice controlled assistant 104/204 may include non-input control mechanisms, such as basic volume control button(s) for increasing/decreasing volume, as well as power and reset buttons. There may also be a simple light element (e.g., LED) to indicate a state such as, for example, when power is on. But, otherwise, the assistant 104/204 does not use or need to use any input devices or displays.

The cylindrical-shaped assistant 104 may be implemented as an aesthetically appealing device with smooth and rounded surfaces, with some apertures for passage of sound waves, and merely having a power cord and optionally a wired interface (e.g., broadband, USB, etc.). In the illustrated implementation, the cylindrical-shaped assistant 104 has an elongated cylindrical housing with apertures or slots formed in a base end to allow emission of sound waves. A more detailed discussion of one particular structure is provided below with reference to FIG. 5. The cube-shaped assistant 204 may also be implemented as an aesthetically appealing device with smooth surfaces, and covered apertures for passage of sound waves. The cube or box shape enables the two speakers to be spaced apart to provide a stereo sound experience for the user.

Once plugged in, each device 104/204 may automatically self-configure, or with slight aid of the user, and be ready to use. As a result, the assistant 104/204 may be generally produced at a low cost. In other implementations, other I/O components may be added to this basic model, such as specialty buttons, a keypad, display, and the like.

Figure 4:
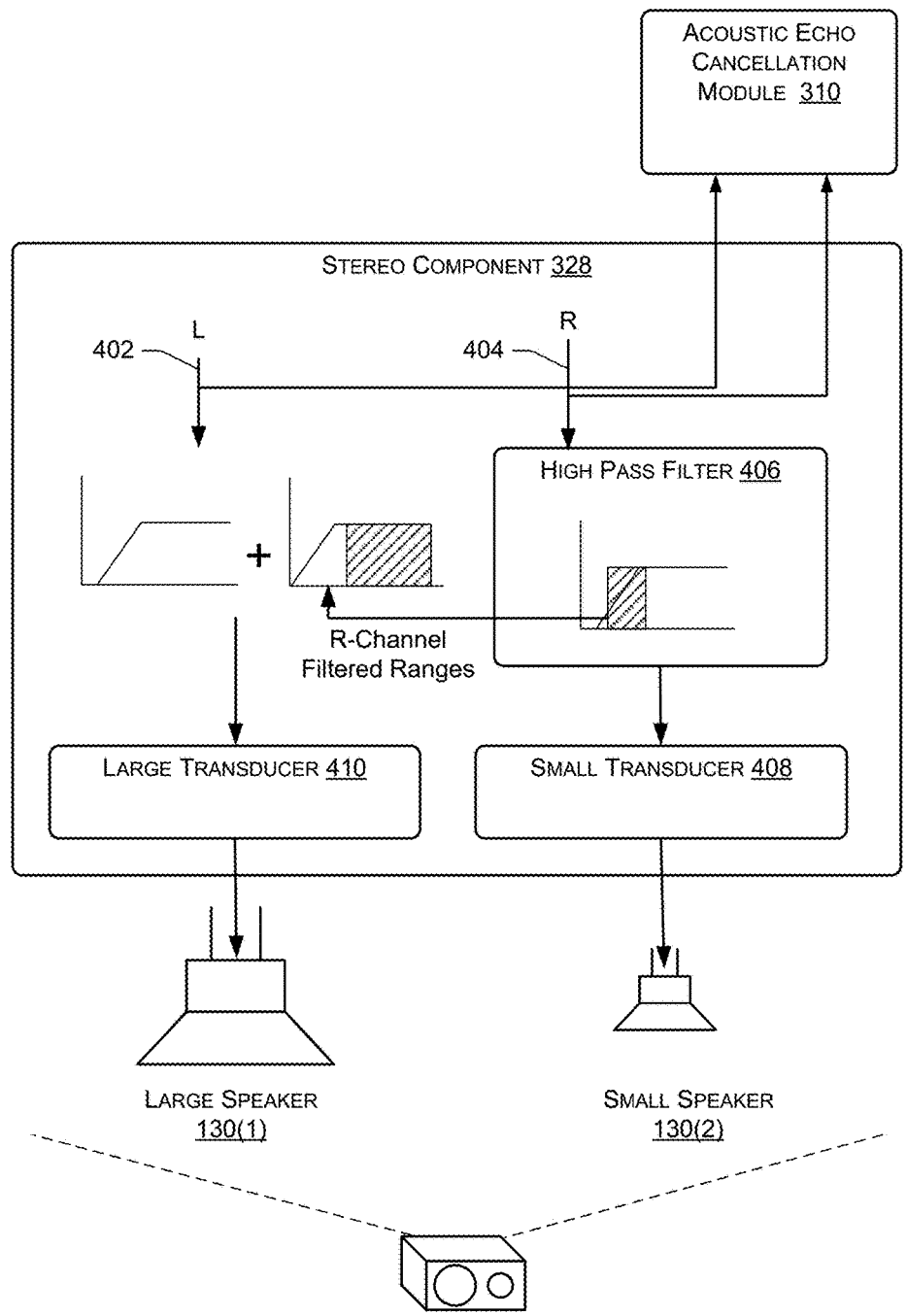
FIG. 4 shows a block diagram of processing elements in a stereo component that is implemented in the voice controlled assistants of FIGS. 1 and 2.

FIG. 4 shows the stereo component 328 from FIG. 3 in more detail. The stereo component 328 generates and/or receives a left channel signal 402 and a right channel signal 404 to be used in the production of stereo sound. The left and right channel signals 402 and 404 are both passed to the AEC module 310 for use in canceling the output sound in the event the assistant 204 is attempting to receive voice input from the user 106. That is, when the user's speech is detected, the AEC module 310 quickly adapts to cancel sound elements in the received audio from the microphone array 124 that are associated with the stereo output from the speakers 130(1) and 130(2) of the assistant 204.

The right channel signal 404 is input to a high pass filter 406 that passes higher frequency portions of the audio signal. A representative frequency range for the high pass filter 408 is 200-1500 Hz. As a result, lower frequency ranges (e.g., 60-200 Hz) are filtered from the right channel signal 404. The output of the high pass filter 406 is provided to the small transducer 408 associated with the small speaker 130(2).

Meanwhile, the left channel signal 402 is input directly to a large transducer 410 associated with the large speaker 130(1). The left channel signal 402 is not filtered, so the entire frequency range represented in the signal is passed to the large transducer 410.

To achieve full spectrum stereo sound from two speakers, the filtered frequencies of the right channel signal 404 that were filtered by the high pass filter 406 are also provided to the large transducer 410. That is, the filtered signal components from the right channel signal 404 are added to the full left channel signal 402. In this manner, no portion of the right channel signal is lost. Because low frequency sound is less directional, adding the lower frequencies of the right channel signal 404 to the left channel signal 402 will be relatively undetectable to a human. Yet, a full frequency response is maintained and the smaller transducer is not distorted.

Figure 5:
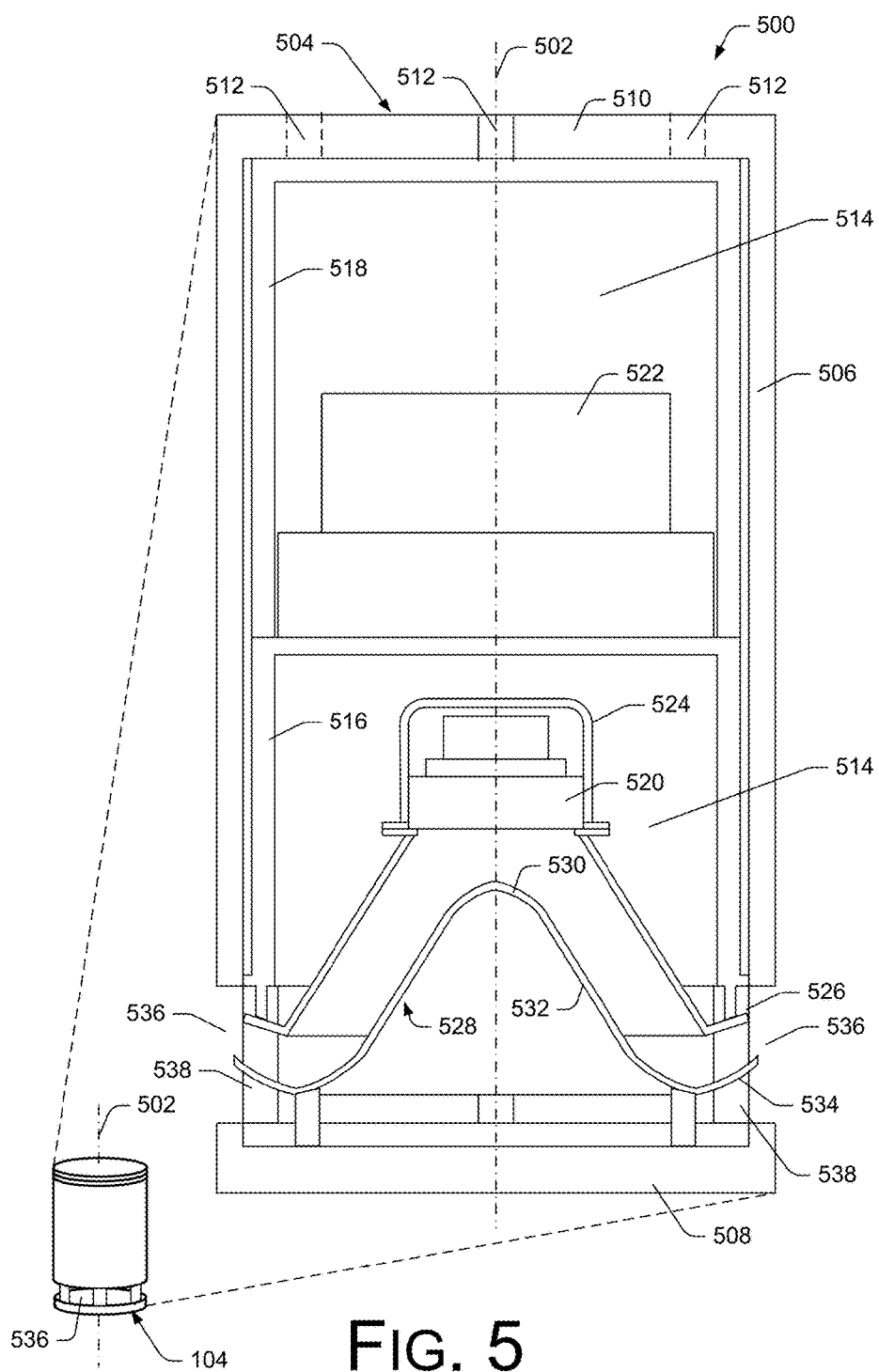
FIG. 5 is a cross sectional view of the voice controlled assistant of FIG. 1 according to one example implementation in which the speakers and microphone array are coaxially aligned.

FIG. 5 is a cross sectional view 500 of the voice controlled assistant 104 taken along a plane that intersects a center axis 502 and passes through a diameter of the cylindrical-shaped housing. The assistant 104 has a housing 504 with an elongated, cylindrical-shaped middle section 506 extending between a first or base end 508 and a second or top end 510. The cylindrical-shaped middle section 506 has a smooth outer surface and due to the rounded shape, the two ends 508 and 510 are circular in shape. The base end 508 is designed to rest on a surface, such as a table 108 in FIG. 1, to support the housing 504. In this position, the top end 510 is distal and upward relative to the base end 508.

One or more microphones 126 are mounted proximal to the top end 510 of the housing 504 to receive or otherwise capture audio input, such as voice input from the user. Multiple orifices 512 are formed in the top end 510 to hold the microphones. There are many possible arrangements of the microphones in the microphone array.

Figure 6:
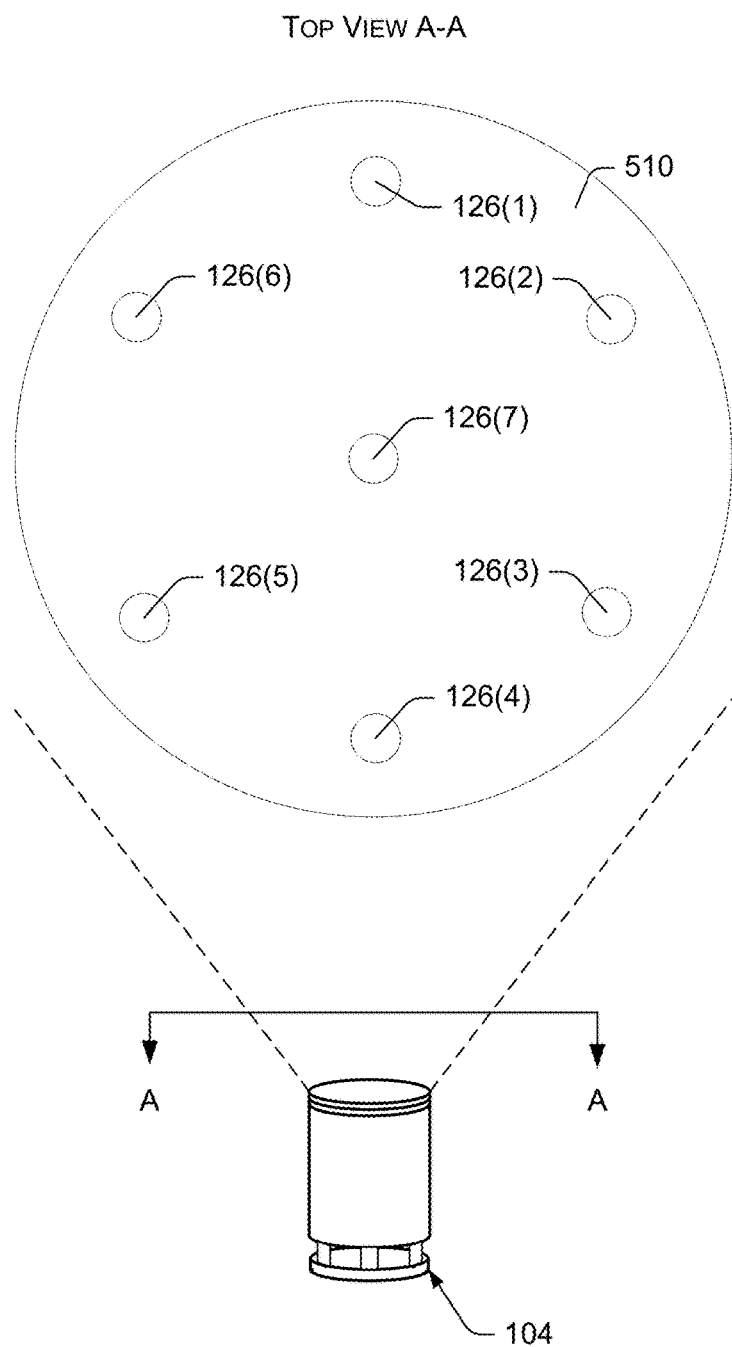
FIG. 6 shows a top down view of the voice controlled assistant of FIG. 1 to illustrate one example arrangement of microphones in the microphone array.

FIG. 6 shows one example arrangement of microphones in the top end 510. More particularly, FIG. 6 shows a top down view of the voice controlled assistant 104 taken along line A-A to illustrate the top end 510 of the housing 504. In this example, the microphone array has seven microphones 126(1), . . . , 126(7). Six of the microphones 126(1)-(6) are placed along a circle concentric with the perimeter of the top end 510. A seventh microphone 126(7) is positioned at the center point of the circular top end 510. It is noted that this is merely one example. Arrays with more or less than seven microphones may be used, and other layouts are possible.

With reference again to FIG. 5, the housing 504 defines a hollow chamber 514 therein. Within this chamber 514 are two skeletal members: a first or lower skeletal member 516 that provides structural support for components in the lower half of the chamber 514 and a second or upper skeletal member 518 that provides structural support for components in the upper half of the chamber 514.

The computing components 132 are mounted in the upper skeletal member 518, but are not shown in FIG. 5 to better illustrate the structural arrangement of the speakers and microphones. The computing components 132 may include any number of processing and memory capabilities, as well as power, codecs, network interfaces, and so forth. Example components are shown in FIG. 3.

Two speakers are shown mounted in the housing 504. A first speaker 520 is shown mounted within the lower skeletal member 516. The first speaker 520 outputs a first range of frequencies of audio sound. In one implementation, the first speaker 520 is a mid-high frequency speaker that plays the middle to high frequency ranges in the human-perceptible audible range. A second speaker 522 is shown mounted within the upper skeletal member 516 above the first speaker 520. In this implementation, the second speaker 522 is a low frequency speaker that plays the low frequency ranges in the human-perceptible audible range. The mid-high frequency speaker 520 is smaller than the low frequency speaker 522.

The two speakers 520 and 522 are mounted in a coaxial arrangement along the center axis 502, with the low frequency speaker 522 atop the mid-high frequency speaker 520. The speakers are also coaxial along the center axis 502 to the microphone array, or more particularly, to the plane intersecting the microphone array. The middle microphone 126(7) is positioned at the center point and lies along the center axis 502. Further, the two speakers 520 and 522 are oriented to output sound in a downward direction toward the base end 508 and away from the microphones 126 mounted in the top end 510. The low frequency speaker 522 outputs sound waves that pass through one or more openings in the lower skeletal member 516. The low frequency waves may emanate from the housing in any number of directions. Said another way, in some implementations, the low frequency speaker 522 may function as a woofer to generate low frequency sound waves that flow omni-directionally from the assistant 104.

The mid-high frequency speaker 520 is mounted within a protective shielding 524, which provides a shield to the sound waves emitted from the low frequency speaker 522. Small openings or slots 526 are formed in middle section 506 of the housing 504 near the base end 502 to pass sound waves from the chamber 514, but the low frequency waves need not be constrained to these slots.

The mid-high frequency speaker 520 emits mid-high frequency sound waves in a downward direction onto a sound distribution cone 528 mounted to the base end 508. The sound distribution cone 528 is coaxially arranged in the housing 504 along the center axis 502 and adjacent to the mid-high frequency speaker 520. The sound distribution cone 528 has a conical shape with a smooth upper nose portion 530, a middle portion 532 with increasing radii from top to bottom, and a lower flange portion 534 with smooth U-shaped flange. The sound distribution cone 528 directs the mid-high frequency sound waves from the mid-high frequency speaker 520 along the smooth conical surface downward along the middle portion 532 and in a radial outward direction from the center axis 502 along the lower flange portion 534 at the base end 508 of the housing 504. The radial outward direction is substantially perpendicular to the initial downward direction of the sound along the center axis 502. In this manner, the sound distribution cone 528 essentially delivers the sound out of the base end 508 of the housing 504 symmetrical to, and equidistance from, the microphone array 124 in the top end 510 of the housing. The sound distribution cone 528 may also have the affect of amplifying the sound emitted from the mid-high frequency speaker 520.

The housing 504 has openings or slots 536 formed adjacent to the base end 508. These slots 536 permit passage of the sound waves, and particularly the high frequency sound waves, emitted from the mid-high frequency speaker 520. The slots 536 are comparatively smaller than the size or diameters of the speakers 520 and 522. However, the sound is still efficiently directed out through the slots 536 by the sound distribution cone 528. Structural posts 538 provide structural stability between the based end 508 and the middle section 506 of the housing 504.

Illustrative Operation

Figure 7:
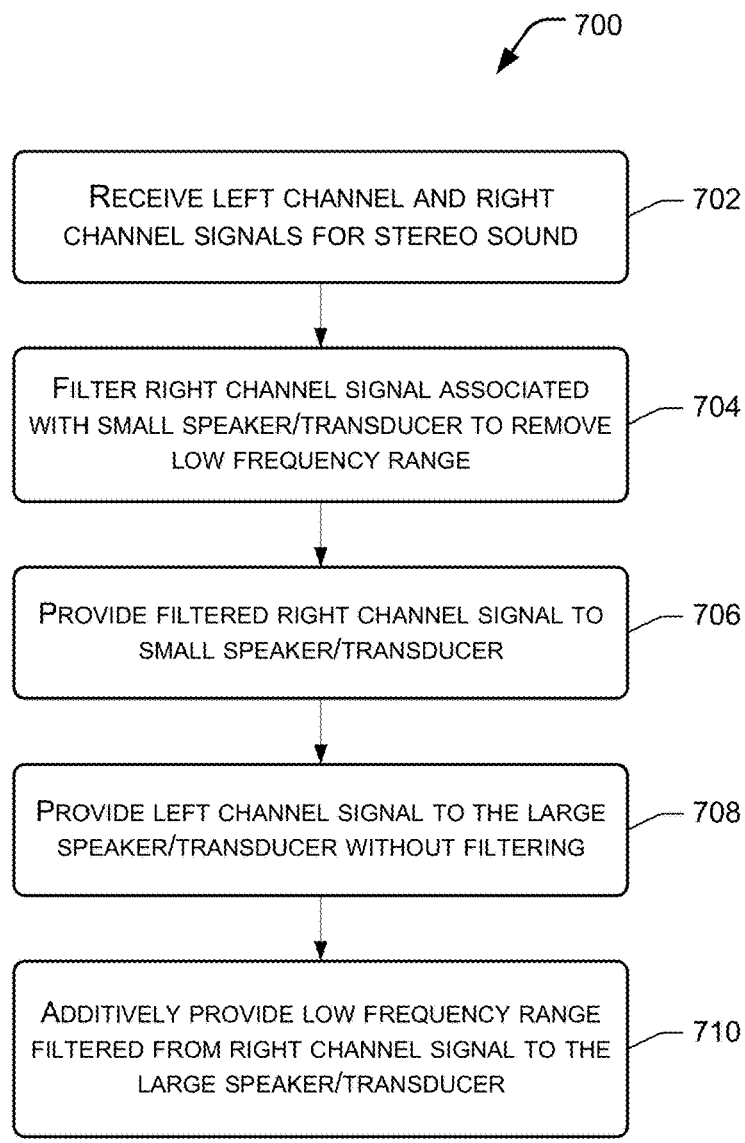
FIG. 7 is a flow diagram showing an illustrative process of producing stereo sound from the voice controlled assistant.

FIG. 7 is a flow diagram of an illustrative process 700 to operate a communication device. This process (as well as other processes described throughout) is illustrated as a logical flow graph, each operation of which represents a sequence of operations. Some of these operations may be implemented in hardware, software, or a combination thereof. In the context of software, the operations represent computer-executable instructions stored on one or more tangible computer-readable storage media that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described operations can be combined in any order and/or in parallel to implement the process.

For purposes of discussion, the process 700 is described with reference to the voice controlled assistant 204. However, the process may be performed by other electronic devices.

At 702, a left channel signal and a right channel signal to be used in the production of stereo sound are received. As shown in FIG. 4, the device 204, and namely the stereo component 328, generates and/or receives a left channel signal 402 and a right channel signal 404.

At 704, the channel signal associated with a small transducer (e.g., the right channel signal) is filtered to remove a portion of the frequencies contained in the signal. In one implementation, the filtered portion covers the low frequency ranges. As one example, the right channel signal 404 is passed through a high pass filter 406 to pass middle and high frequencies, while removing the low frequencies (e.g., removing frequencies of 60 to 200 Hz).

At 706, the filtered right channel signal is provided to the smaller speaker associated with the smaller speaker. In FIG. 4, for example, the filtered right channel signal is sent to the small transducer 408 for output from the small speaker 130(P).

At 708, the other channel signal associated with the larger transducer 410 (e.g., the left channel signal) is passed to the larger transducer associated with the larger speaker. Again, with reference to FIG. 4, the left channel signal 402 is passed to the transducer 410 for output from the larger speaker 130(1).

At 710, the low frequency ranges filtered from the right channel signal are added to the left channel signal. The added component is also passed to the transducer 410 of the large speaker 130(1). In this manner, the entire left and right channel signals are passed to the speakers to ensure full spectrum stereo sound. Further, the full right channel signal is preserved and output, even though different portions of it are played through the two speakers.

CONCLUSION

Although the subject matter has been described in language specific to structural features and/or methodological acts, it is to be understood that the subject matter defined in the appended claims is not necessarily limited to the specific features or acts described. Rather, the specific features and acts are disclosed as illustrative forms of implementing the claims.

What is claimed is:

1. A device comprising:
a housing comprising a first end and a second end disposed opposite the first end;
a plurality of microphones arranged near the first end of the housing;
a first speaker and a second speaker disposed in a coaxial arrangement along a center axis of the housing;
a sound distribution cone disposed near the second end of the housing and configured to direct soundwaves produced by the second speaker in a direction substantially orthogonal to the center axis; and
one or more computing components disposed near the first end of the housing.

2. The device of claim 1, wherein the first end of the housing comprises an upper skeletal member and the second end of the housing comprises a lower skeletal member.

3. The device of claim 2, wherein the first speaker is supported by the lower skeletal member and the second speaker is supported by the upper skeletal member.

4. The device of claim 1, wherein at least one of the first speaker and the second speaker is configured to generate sound waves that emit omni-directionally from the device.

5. The device of claim 1, wherein the plurality of microphones are configured to capture audio input from an environment surrounding the device.

6. The device of claim 1, wherein the first end of the device is configured with one or more orifices to receive the plurality of microphones.

7. The device of claim 1, wherein the first speaker and the second speaker are disposed in the coaxial arrangement relative to the plurality of microphones.

8. The device of claim 1, wherein the first speaker and the second speaker are oriented to output sound waves towards the second end of the housing.

9. The device of claim 1, wherein the first speaker is configured to operate at a first range of frequencies and the second speaker is configured to operate at a second range of frequencies, the first range of frequencies being different from the second range of frequencies.

10. The device of claim 1, wherein the second speaker is disposed within a protective shielding, the protective shielding is coupled to the sound distribution cone, and the protective shielding is configured to shield the second speaker from sound waves emitted from the first speaker.

11. A device comprising:
a housing comprising a top end and a lower end disposed opposite the top end;
a plurality of orifices disposed near the top end of the housing, the plurality of orifices configured to house a plurality of microphones;
a plurality of speakers disposed in a coaxial arrangement along a center axis of the housing; and
a sound distribution cone disposed in a coaxial arrangement along the center axis of the housing, wherein the sound distribution cone is configured to direct sound waves emitted from a subset of the plurality of speakers to an environment surrounding the device.

12. The device of claim 11, wherein a speaker of the plurality of speakers is configured to generate sound waves that emit omni-directionally from the device.

13. The device of claim 11, wherein:
the sound distribution cone comprises an upper nose portion, a middle portion, and a lower flange portion, and
radii of the middle portion increase from a first section of the middle portion adjacent to the upper nose portion to a second section of the middle portion adjacent to the lower flange portion.

14. The device of claim 13, wherein the lower flange portion is disposed adjacent to the lower end of the housing.

15. The device of claim 11, further comprising a plurality of openings disposed near the lower end of the housing and wherein the sound distribution cone is configured to direct the sound waves emitted from the subset of the plurality of speakers in a radial outward direction and towards the plurality of openings.

16. A device comprising:
a housing comprising a first support member and a second support member;
a first speaker supported by the first support member and a second speaker supported by the second support member, the first speaker and the second speaker disposed in a coaxial arrangement along a center axis of the housing;
a plurality of openings disposed near the second support member; and
a sound distribution cone disposed near the second support member and configured to direct soundwaves produced by the second speaker towards the plurality of openings.

17. The device of claim 16, wherein:
the second speaker is disposed proximate to a lower end of the housing,
the first speaker is disposed proximate to a top end of the housing, the top end of the housing being arranged opposite the lower end of the housing, and
the first speaker and the second speaker are configured to output sound waves towards the lower end of the housing.

18. The device of claim 16, wherein the plurality of openings individually have dimensions that are smaller than a first diameter of the first speaker and a second diameter of the second speaker.

19. The device of claim 16, wherein the device further comprises a protective shielding, and wherein the second speaker is disposed within the protective shielding.

20. The device of claim 19, wherein the protective shielding is coupled to the sound distribution cone and configured to shield the second speaker from sound waves emitted from the first speaker.

* * * * *